US012092541B2

(12) United States Patent
Goldsmith

(10) Patent No.: US 12,092,541 B2
(45) Date of Patent: Sep. 17, 2024

(54) APPARATUS AND METHODS FOR IMPACT TOOL TESTING

(71) Applicant: Tungsten Capital Partners, LLC, Solon, OH (US)

(72) Inventor: Brian Goldsmith, Solon, OH (US)

(73) Assignee: Tungsten Capital Partners, LLC, Solon, OH (US)

( * ) Notice: Subject to any disclaimer, the term of this patent is extended or adjusted under 35 U.S.C. 154(b) by 0 days.

(21) Appl. No.: 17/191,662

(22) Filed: Mar. 3, 2021

(65) Prior Publication Data

US 2021/0278298 A1 Sep. 9, 2021

Related U.S. Application Data

(60) Provisional application No. 62/984,411, filed on Mar. 3, 2020.

(51) Int. Cl.
*G01L 3/20* (2006.01)
*G01L 5/00* (2006.01)

(52) U.S. Cl.
CPC . *G01L 3/20* (2013.01); *G01L 5/00* (2013.01)

(58) Field of Classification Search
CPC .... G01L 25/003; B25B 21/005; B25B 21/004
See application file for complete search history.

(56) References Cited

U.S. PATENT DOCUMENTS

| 2,867,117 | A | * | 1/1959 | Ernst | G01L 25/003 173/176 |
| 2,961,904 | A | * | 11/1960 | Sergan | B25B 21/005 81/57.44 |
| 3,354,705 | A | * | 11/1967 | Dyer, Jr. | G01L 5/0042 73/761 |
| 3,372,611 | A | * | 3/1968 | Amanti | G01L 25/003 81/60 |
| 3,388,751 | A | * | 6/1968 | Bernaux | G01L 25/003 408/139 |
| 3,429,179 | A | * | 2/1969 | Fischer | G01L 5/0042 73/761 |
| 3,457,780 | A | * | 7/1969 | Agostini | G01L 25/003 73/761 |
| 3,686,983 | A | * | 8/1972 | Flagge | B25B 23/145 81/429 |
| 3,866,493 | A | * | 2/1975 | Ringerud | B25B 21/00 81/57.39 |

(Continued)

*Primary Examiner* — Tran M. Tran
(74) *Attorney, Agent, or Firm* — Renner, Otto, Boisselle & Sklar, LLP

(57) ABSTRACT

A torque testing device includes a body defining an interior volume that is defined by an interior wall having a non-circular cross-section. A moveable portion is within the interior volume and is selectively movable from a first orientation within the interior volume to a second orientation within the interior volume. The moveable portion includes a core defining an aperture and a piston. A portion of the piston cooperates with the aperture of the core. When the moveable portion is in the first orientation, the piston is located at a first distance from the core. When the moveable portion is in the second orientation, the piston is located at a second distance from the core, the second distance being less than the first distance.

19 Claims, 14 Drawing Sheets

(56) References Cited

U.S. PATENT DOCUMENTS

| | | | | |
|---|---|---|---|---|
| 4,150,559 | A * | 4/1979 | Levy | G01L 25/003 73/862.12 |
| 4,383,584 | A * | 5/1983 | Dyck | G01G 5/003 177/208 |
| 4,513,644 | A * | 4/1985 | Weyer | B25B 21/004 81/57.39 |
| 4,517,821 | A * | 5/1985 | Taggart | G01L 25/003 702/41 |
| 4,533,337 | A * | 8/1985 | Schoeps | B25B 21/026 464/25 |
| 4,543,814 | A * | 10/1985 | Heilman | G01L 25/003 73/862.08 |
| 4,562,722 | A * | 1/1986 | Schuele | G01L 25/003 73/11.01 |
| 4,583,411 | A * | 4/1986 | Hales | G01L 25/003 73/862.09 |
| 4,649,757 | A * | 3/1987 | Crespin | G01L 25/003 73/104 |
| 4,735,595 | A * | 4/1988 | Schoeps | B25B 21/026 464/25 |
| 4,794,825 | A * | 1/1989 | Schmoyer | B25B 23/0078 81/57.24 |
| 4,848,145 | A * | 7/1989 | Blaschke | E21B 43/267 73/152.55 |
| 4,987,825 | A * | 1/1991 | Weyer | F15B 15/068 92/65 |
| 5,056,384 | A * | 10/1991 | Sergan | B25B 21/002 81/57.39 |
| 5,353,654 | A * | 10/1994 | Lin | G01L 25/003 73/865.9 |
| 5,429,017 | A * | 7/1995 | Junkers | B25B 13/466 81/57.44 |
| 5,703,277 | A * | 12/1997 | Grabovac | G01L 25/003 73/1.09 |
| 5,886,246 | A * | 3/1999 | Bareggi | G01L 25/003 73/1.09 |
| 6,202,028 | B1 * | 3/2001 | Crane | G01L 25/003 702/41 |
| 6,715,362 | B2 * | 4/2004 | Chiapuzzi | G01L 25/003 73/761 |
| 6,718,831 | B2 * | 4/2004 | Chiapuzzi | G01L 25/003 73/761 |
| 7,222,544 | B1 * | 5/2007 | Jenkins | G01L 25/003 73/862.21 |
| 7,367,229 | B2 * | 5/2008 | Engstrom | F16K 11/085 73/168 |
| 7,428,845 | B1 * | 9/2008 | Collins | G01L 5/243 73/825 |
| 7,602,562 | B2 * | 10/2009 | Kosmowski | G02B 7/023 359/811 |
| 7,885,780 | B2 * | 2/2011 | Lucke | G01L 25/003 702/108 |
| 8,090,554 | B2 * | 1/2012 | Chen | G01L 25/003 702/166 |
| 8,108,158 | B2 * | 1/2012 | Hetzel | G01L 25/003 702/43 |
| 8,453,519 | B2 * | 6/2013 | Zhang | G01L 5/0042 73/862.08 |
| 8,459,091 | B2 * | 6/2013 | Chiapuzzi | G01L 25/003 73/1.09 |
| 8,528,387 | B2 * | 9/2013 | Fietz | G01N 33/38 73/78 |
| 8,650,928 | B2 * | 2/2014 | Herbold | G01L 25/003 73/1.12 |
| 8,726,715 | B2 * | 5/2014 | Cottogni | G01L 25/003 73/1.09 |
| 8,806,961 | B1 * | 8/2014 | Reilly | G01L 25/003 73/862.21 |
| 8,833,134 | B2 * | 9/2014 | Gray | G01L 25/003 73/1.12 |
| 8,931,324 | B2 * | 1/2015 | Yamamoto | G01L 25/003 73/1.09 |
| 9,227,618 | B2 * | 1/2016 | Francesco | F16H 61/4192 |
| 9,250,170 | B2 * | 2/2016 | Su | G01N 3/22 |
| 9,347,804 | B2 * | 5/2016 | Weissacher | G01R 31/2891 |
| 9,557,235 | B2 * | 1/2017 | Kaindl | A47B 81/061 |
| 9,618,416 | B2 * | 4/2017 | Okada | G01L 25/003 |
| 9,702,797 | B2 * | 7/2017 | Yang | G01N 3/22 |
| 10,048,165 | B2 * | 8/2018 | Lee | G01M 13/04 |
| 10,288,506 | B2 * | 5/2019 | Pattok | G01L 25/003 |
| 10,317,303 | B2 * | 6/2019 | Spirer | G01L 25/003 |
| 10,317,304 | B2 * | 6/2019 | Boccellato | B25H 1/005 |
| 10,345,183 | B2 * | 7/2019 | Sartori | G01L 5/24 |
| 10,613,010 | B2 * | 4/2020 | Salomon | G01N 11/14 |
| 10,940,577 | B2 * | 3/2021 | Chu | G01L 25/003 |
| 11,097,403 | B2 * | 8/2021 | Carlson | B25F 5/02 |
| 2014/0150568 | A1 * | 6/2014 | Delbridge | G01L 5/0042 73/862.21 |
| 2017/0234755 | A1 * | 8/2017 | Pietron | G01L 3/102 29/593 |
| 2019/0310156 | A1 * | 10/2019 | Kleza | B25B 23/1425 |
| 2021/0262881 | A1 * | 8/2021 | Wern | G01L 5/24 |
| 2022/0145909 | A1 * | 5/2022 | Hughes | F04B 49/10 |
| 2022/0381675 | A1 * | 12/2022 | Haiz | G01N 33/24 |

\* cited by examiner

APPARATUS AND METHODS FOR IMPACT TOOL TESTING

CROSS REFERENCE TO RELATED APPLICATIONS

This application claims priority to U.S. Provisional Patent Application No. 62/984,411, filed on Mar. 3, 2020, entitled "APPARATUS AND METHODS FOR IMPACT TOOL TESTING," which is hereby incorporated by reference herein.

TECHNICAL FIELD

The instant disclosure is generally directed toward devices and methods for measuring a torque output of tools. For example, the instant disclosure is directed toward a bench top apparatus and methods configured to measure a torque output of power-driven impact wrenches.

BACKGROUND

Impact tools such as impact wrenches are power-driven wrenches designed for tightening and loosening threaded connections such as screws, bolts, nuts, etc. by imparting rotation to a portion of the threaded connection through a rapid series of impacts until the threaded connection is tightened or loosened to a desired state. The desired state can include securement of the threaded connection, removal of a nut, reaching a desired maximum tension in a bolt, etc.

Many known testing devices for impact tools are relatively expensive, complicated, and lack repeatability. Additionally, many known testing devices produce results dependent upon various factors such as the stiffness of the entire system, the amount of wear in the testing device and the threaded fastener used in the test, and the lubrication of the threaded fastener. Each of these dependencies decrease the repeatability and reliability of the test results, because each operator may use varying steps and use various components to complete the torque test. As an example, and operator may utilize a hard joint or a soft joint to conduct the test which would vary the stiffness of the fastener system and produce varying results between different test set-up arrangements. Thus, improvements to devices and methods for measuring a torque output of tools are desired.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In some examples, a torque testing device includes a body defining an interior volume defined by an interior wall. The interior wall has a non-circular cross-section. The torque testing device also includes a moveable portion within the interior volume. The moveable portion is selectively movable from a first orientation within the interior volume to a second orientation within the interior volume. The moveable portion includes a core defining an aperture and a piston. A portion of the piston cooperates with the aperture of the core. When the moveable portion is in the first orientation, the piston is located at a first distance from the core. When the moveable portion is in the second orientation, the piston is located at a second distance from the core. The second distance is less than the first distance.

In some examples, a method of operating a torque testing device includes providing a torque testing device. The torque testing device includes a body defining an interior volume. The interior volume is defined by an interior wall having a non-circular cross-section. The torque testing device also includes a moveable portion located within the interior volume. The moveable portion has a contact axis. The moveable portion includes a first component configured to move relative to a second component to create a fluid pressure between the first component and the second component. The contact axis is colinear with a first dimension of the interior volume when the moveable portion is in the first orientation. The contact axis is colinear with a second dimension of the interior volume when the moveable portion is in the second orientation. The second dimension is less than the first dimension. The method also includes moving the moveable portion from the first orientation to the second orientation. The method further includes reading a torque measurement from a gauge.

In some examples, a method of operating a torque testing device includes providing a torque testing device. The torque testing device includes a body defining an interior volume. The interior volume is defined by an interior wall having a non-circular cross-section. The torque testing device also includes a moveable portion within the interior volume. The moveable portion includes a core that is selectively movable from a first orientation within the interior volume to a second orientation within the interior volume. The core defines an aperture. The torque testing device further includes a piston, a portion of the piston cooperates with the aperture of the core. When the core is in the first orientation, the piston is located at a first distance from the core. When the core is in the second orientation, the piston is located at a second distance from the core, the second distance being less than the first distance. The method also includes attaching a torque tool to the torque testing device. The method further includes operating the torque tool to move the moveable portion to generate a fluid pressure between the piston and the core until the fluid pressure between the piston and the core is great enough to resist further movement of the moveable portion.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DETAILED DESCRIPTION

Figure 1:
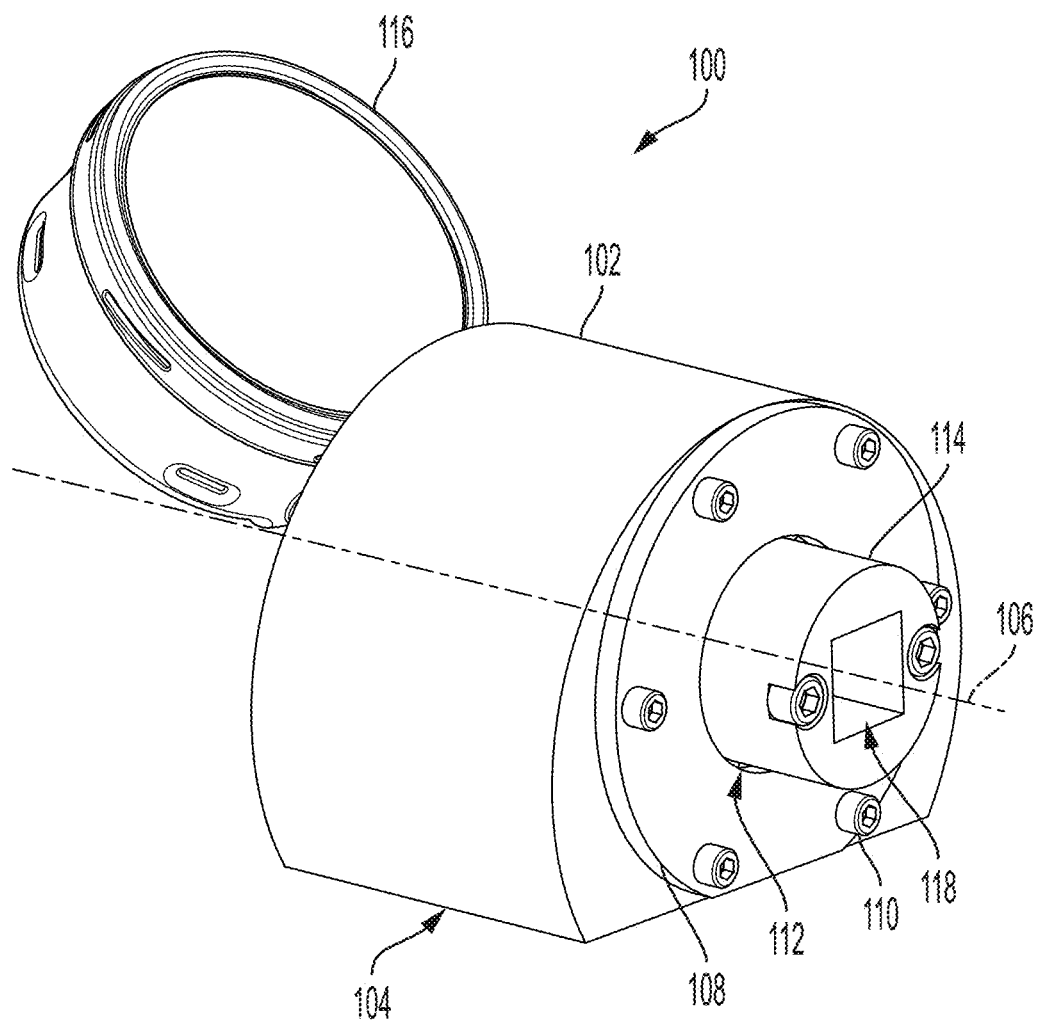
FIG. 1 is a perspective view of an example torque testing device according to at least one embodiment of the present disclosure.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

The present disclosure describes a torque testing device and methods for testing a torque output of a tool. In some examples, the tool is a power-driven torque wrench. It is to be appreciated that the term power-driven torque wrench can include any number of tools of various names including, but not limited to, impact wrenches, intermittent drive wrenches, discontinuous drive tools, impulse wrenches, etc. Any of these terms may be used interchangeably in the present disclosure, although the term "impact wrench" appears most often. This disclosure will use the terms "impact tool" and "torque tool" interchangeably.

The impact wrench can be a pneumatic tool that is configured to be powered by a compressed gas, such as compressed air. However, it is to be appreciated that embodiments of the present disclosure described herein may be used in impact wrenches that are powered by hydraulic or electric drive systems, including battery-powered systems as well.

In many applications using threaded fasteners, engineering designs, testing standards, etc. may specify a particular bolt tension or range of bolt tension values to help ensure that the connection provided by the threaded fastener meets the engineering design or testing standard. Impact wrenches are used to provide an amount of torque to an item, such as a bolt or a nut that is being tightened/secured to another object. Operators of impact wrenches may have difficulty when using impact wrenches to identify when a bolt is properly secured (e.g., tensioned) to the item(s) to which the bolt is being tightened. One common method for determining proper bolt securement is to use a measurement of torque applied to the bolt or the nut in the threaded connection. In some examples, a torque value is measured and determined whether the measured torque value has passed a threshold torque value at which it can be determined that the threaded components are secured to achieve a desired bolt tension.

However, many operators may not be aware of the actual torque generated by a particular impact wrench, as many testing devices are found to be wanting increased accuracy, improved repeatability, and testing methods that better reflect real-world operation of the impact wrench. Additionally, because the impacts of the impact wrenches are only momentary, determination of torque output is often difficult.

Referring to FIG. 1, an example torque testing device 100 is illustrated. In some examples, the torque testing device 100 can be used for determining actual torque output values for impact wrenches (not shown). As previously noted, the impact wrench can be any number of power tools such as intermittent drive wrenches, discontinuous drive tools, impulse wrenches, etc. that employ pneumatic drives, hydraulic drives, electric drives, battery-powered drives, etc.

The torque testing device 100 includes a body 102 that can comprise any suitable material designed to withstand anticipated loads and forces during typical operation of the torque testing device 100. In some examples, the body 102 is composed of steel. As shown, the body 102 can be of unitary construction, such as a piece of machined round bar stock, cast metal, etc. In some examples, the body 102 can include multiple pieces assembled to create the entire body 102. Additionally, the body 102 can include a flat side 104 configured to provide a surface upon which the torque testing device 100 can cooperate with a top-facing surface of a work bench. In some examples, the body 102 can include structures such as flanges or define apertures such as bolt holes to facilitate mounting of the torque testing device 100 to another surface (e.g., the top-facing surface of a work bench) or to other structures such as a dedicated base unit. As shown, the body 102 can be centered about a central axis, represented by line 106.

Figure 2:
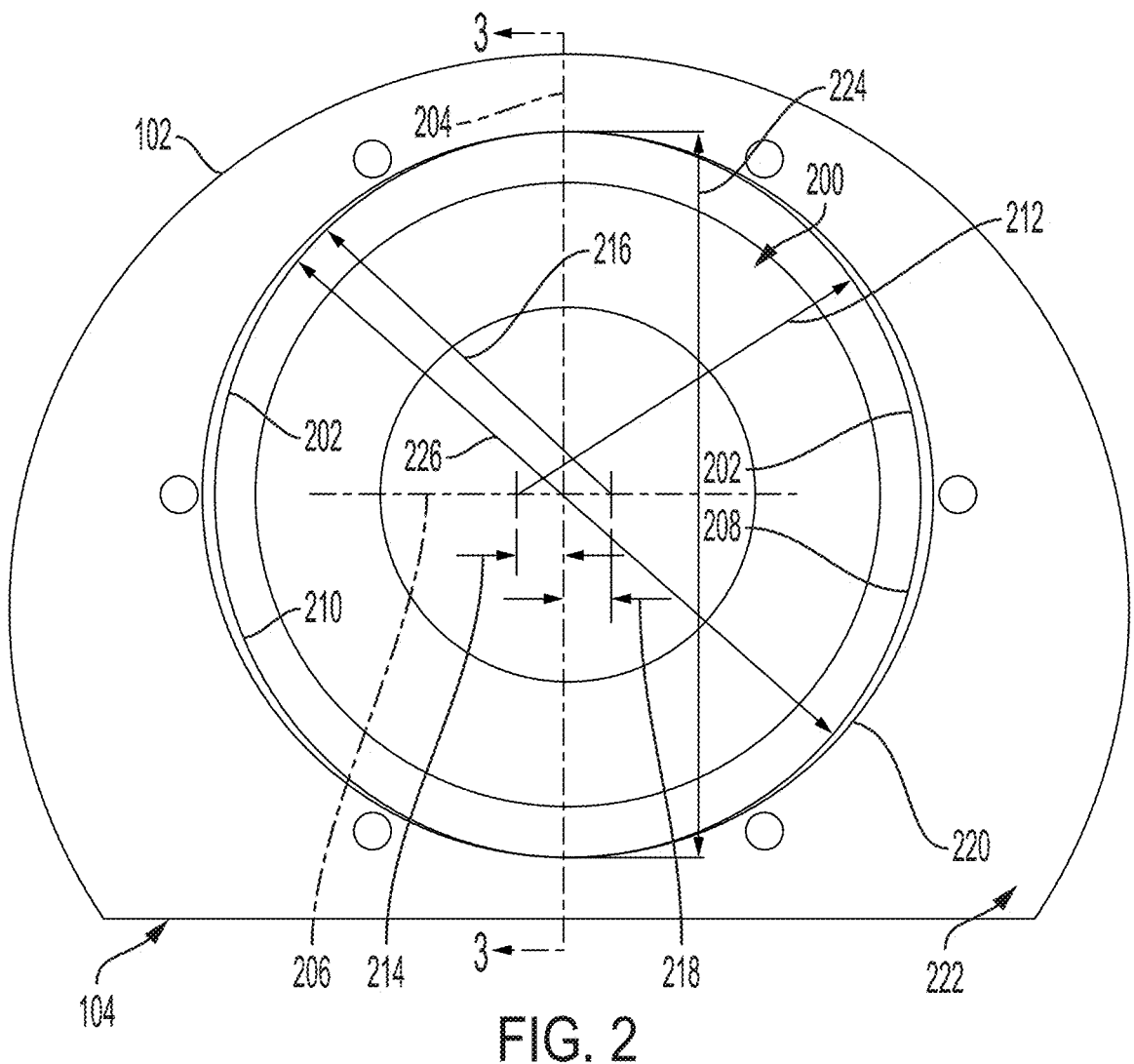
FIG. 2 is an elevation view of a body of the torque testing device of FIG. 1.

Referring to FIG. 2, an elevation view of the body 102 is illustrated. The body 102 defines an interior volume 200. The interior volume 200 is defined by an interior wall 202. It is to be appreciated that the interior wall 202 can take the form of a single, continuous wall or the interior wall 202 could be made up of a combination of more than one segment. In other words, the interior wall 202 can be a single, closed curve, however, in some examples, the interior wall 202 can be formed by a number of wall segments that can be curved, straight, or a combination of curved and straight segments. Regardless of the wall or wall segments that combine to form the interior wall 202, the interior wall 202 is non-circular when viewed in a cross-section or an elevation view such as that in FIG. 2. For example, the interior wall 202 has a non-circular cross-section. In some examples, the non-circular cross-section is defined by portions of two offset circular cross-sections.

For reference purposes, the interior volume 200 can be centered about a vertical centerline, represented by the cross-section line 3-3, also having reference character 204. The interior volume 200 can also be centered about a horizontal centerline 206. In the shown example, the interior wall 202 is composed of two semi-circular profiles when viewed in cross-section. Here, a first segment 208 of the interior wall 202 is located on the right side of the vertical centerline 204, and a second segment 210 of the interior wall 202 is located on the left side of the vertical centerline 204.

As noted, the first segment 208 and the second segment 210 are semi-circular and join each other at the top and bottom of the cross-section of the interior volume 200. The profile of the interior wall 202 at the location where the first segment 208 and the second segment 210 connect with each other is not necessarily a smooth transition. The first segment 208 can be defined by a radius 212 having a center point on the horizontal centerline 206 and offset from the vertical centerline 204 by a length having the dimension 214. The second segment 210 can be defined by a radius 216 having a center point on the horizontal centerline 206 and offset from the vertical centerline 204 by a length having the dimension 218. In some examples, dimension 214 is equal to dimension 218. It is to be appreciated that FIG. 2 represents dimension 214 and dimension 218 exaggerated for clarity. In some examples, the offset distances (e.g., dimension 214 and dimension 218) are between about 0.2 inches and about 0.05 inches. In more particular examples, the offset distances are between about 0.1 inches and 0.05 inches. Offset cross-sectional profiles can also be interpreted as two non-concentric cylindrical cross-sectional profiles.

It is to be understood that the example non-circular cross-section being defined by portions of two horizontally offset circular cross-sections (e.g., two semi-circular cross-sections) is not meant to be limiting. Any suitable non-circular cross-sections are contemplated and can be used in conjunction with the devices and methods of the present disclosure. Further examples may include vertically offset cross-sections. Still more examples may include cross-sections having only one interior wall segment offset, while other wall segment(s) may be centered about the intersection of the vertical centerline 204 and the horizontal centerline 206. Further examples can include the non-circular cross-sections of an ellipse, a parabolic profile, a hyperbolic profile, a volute profile, straight line profiles, or combinations of these cross-sections and profiles. Regardless of the design and manufacture of the cross-sections and profiles used with the body 102, distances from the central axis 106 of the interior volume 200 to various points along the interior wall 202 are not constant when measured at the various points. In some examples, the distances decrease as they are measured continuing either clockwise or counter-clockwise from the top of the interior volume 200.

As shown in FIG. 2, the body 102 can also define a chamfer 220 between the interior wall 202 and a front face 222 of the body 102. In the shown example, the chamfer 220 is circular, which can accentuate the offset semi-circular profiles of the interior wall 202. In some examples, it is advantageous to provide the chamfer 220, but it is not necessarily present.

Figure 3:
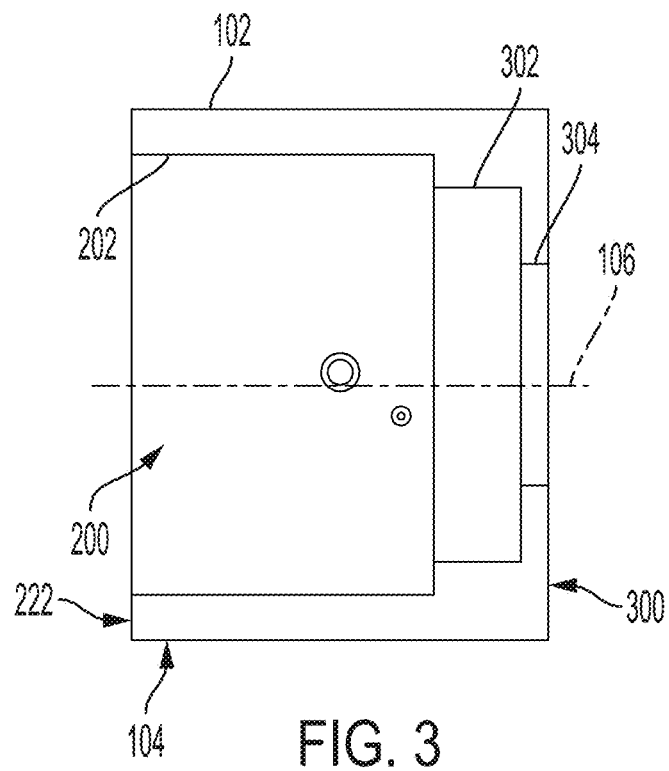
FIG. 3 is a cross-section view of the body taken along line 3-3 of FIG. 2.

Referring to FIG. 3, a cross-section view taken along line 3-3 of FIG. 2 is illustrated. The interior volume 200 as defined by the interior wall 202 can be a blind hole. In some examples, the interior volume 200 is not of constant cross-section between the front face 222 of the body 102 and a rear face 300 of the body 102. For example, as shown in FIG. 3, the interior volume 200 can include step 302 and step 304 such that the interior volume 200 is defined by smaller cross-sections at the end of the interior volume 200 closer to the rear face 300 of the body 102. Furthermore, the volumes defined by step 302 and step 304 can have circular cross-sections as shown in FIG. 2, and both can be centered about the central axis 106.

Returning to FIG. 1, the torque testing device 100 can also include a cover 108 provided to cover the interior volume 200 and limit undesired intrusion of dirt, dust, foreign material, etc. from entering the interior volume 200 from a space exterior to the interior volume 200. The cover 108 can be attached to the body 102 in any suitable manner including, but not limited to, threaded fasteners 110 as shown in FIG. 1. The cover 108 can also define a through hole 112 configured to provide access by an adapter 114 (to be discussed below) into the interior volume 200. In some examples, the cover 108 can be omitted in favor of other structures including, but not limited to, retaining rings, etc.

Figure 4:
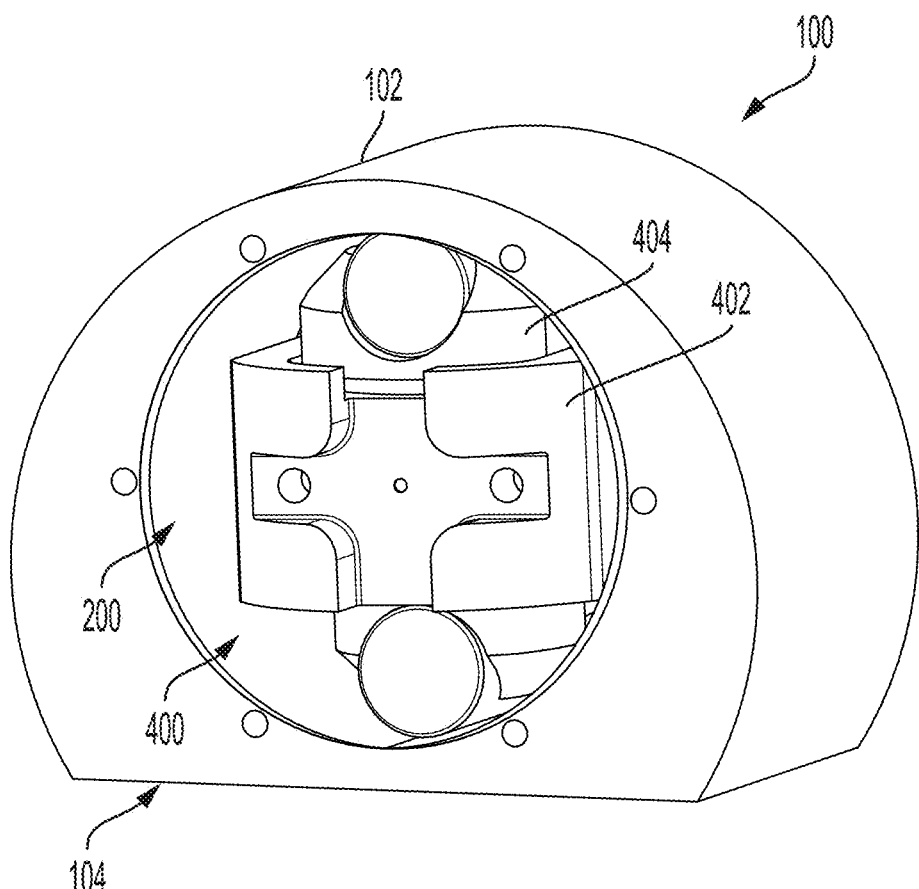
FIG. 4 is a perspective view of the torque testing device of FIG. 1 with a cover and an adapter removed.

Referring to FIG. 4, a perspective view of the torque testing device 100 is shown without the cover 108, the threaded fasteners 110, and the adapter 114 in order to provide a view into the interior volume 200. The torque testing device 100 includes a moveable portion 400 within the interior volume 200. The moveable portion 400 includes a core 402 and a piston 404.

Figure 5:
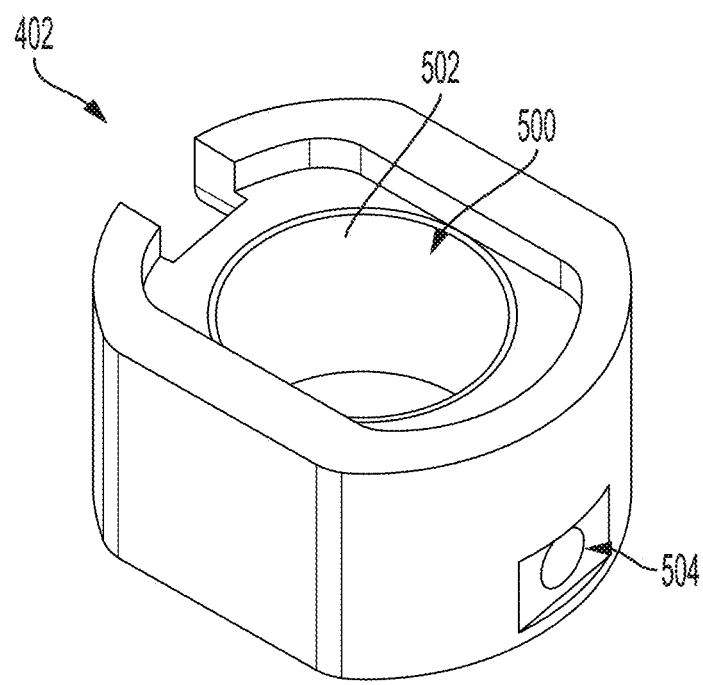
FIG. 5 is a perspective view of an example core of the torque testing device of FIG. 1.

Referring to FIG. 5, a perspective view of an example core 402 is illustrated. The view shown is from the perspective of a top rear view with respect to how the torque testing device 100 is illustrated in FIG. 1. The core 402 defines an aperture 500. The aperture 500 can be defined by an interior wall 502 having any suitable cross-sectional shape. However, most commonly, the interior wall 502 will have a circular cross-section to define a cylinder. As such, the aperture 500 can be cylindrical. The core 402 can also define a second aperture 504 that is in fluid communication with the aperture 500 (shown in FIG. 9).

Figure 6:
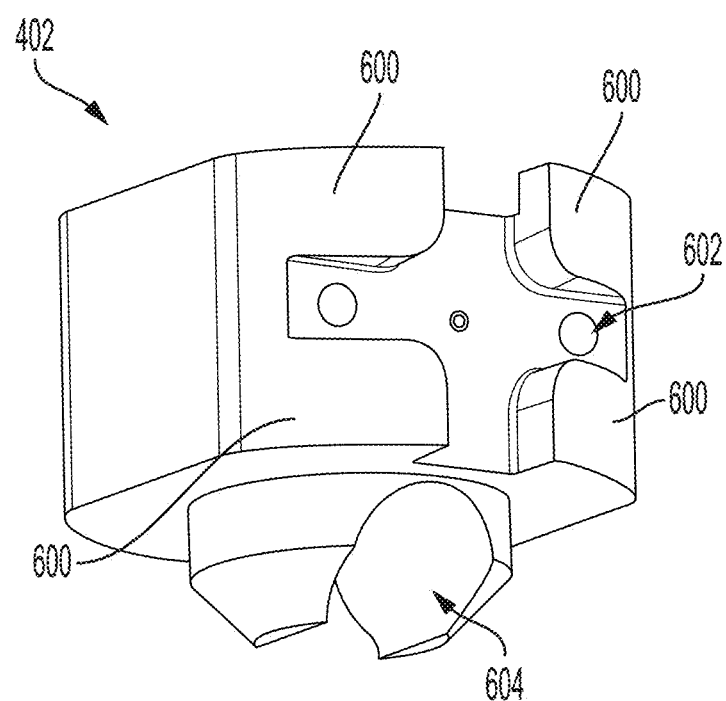
FIG. 6 is another perspective view of the core of FIG. 5.

Referring to FIG. 6, a different perspective view of the core 402 is illustrated. The view shown is from the perspective of a bottom front view with respect to how the torque testing device 100 is illustrated in FIG. 1. The core 402 can includes structure 600 configured to align the adapter 114 for mounting to the core 402 and/or provide physical impediment to relative rotation between the adapter 114 and the core 402 after the adapter 114 is mounted to the core 402. To facilitate mounting of the adapter 114 to the core 402, the core 402 can define a mounting hole 602 (e.g., threaded holes for cooperation with threaded male fasteners). The core 402 can also define an opening 604 configured to mount a bar (to be discussed below). In some examples, the opening 604 is cylindrical, however, this is not meant to be limiting, and any suitable mounting structure can be provided to mount the bar to the core 402. As with the body 102, the core 402 can be composed of steel. As shown, the core 402 can be monolithic, such as machined stock, cast metal, etc. In some examples, the core 402 can include multiple pieces assembled to create the entire core 402.

Figure 7:
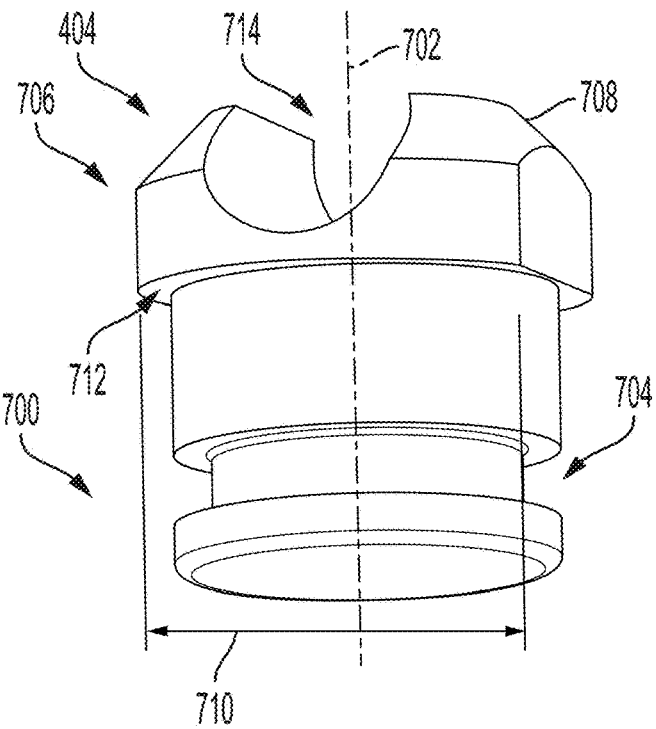
FIG. 7 is a perspective view of an example piston of the torque testing device of FIG. 1.

Referring to FIG. 7, a perspective view of the piston 404 is illustrated. The piston 404 includes a proximal portion 700 configured to cooperate with the aperture 500 of the core 402. The proximal portion 700 has any suitable cross-sectional shape that is commensurate with the cross-sectional profile of the aperture 500. As described previously, the most common cross-sectional shape of the proximal portion is a circular cross-section such that the piston 404 cooperates with the aperture 500 that acts as a cylinder, with the piston 404 able to move inward and outward relative to the aperture 500 in a direction parallel to an axis 702.

The proximal portion 700 can define a seal groove 704 configured to retain a portion of a sealing structure that will be discussed below.

A distal portion 706 of the piston 404 can include a head 708. The head can have at least one dimension 710 lying in a plane that is perpendicular to the axis 702. The dimension 710 can be greater than the diameter of the aperture 500. As such, the head 708 provides a physical interference preventing the distal portion 706 from passing into the aperture 500. In some examples, an underside 712 of the head 708 can contact a side of the core 402 adjacent the aperture 500. Despite the presence of the physical interference described, during most testing scenarios, the piston 404 will cease movement into the aperture 500 due to increased oil pressure within the aperture 500 as will be described below. It is to be understood that the described physical interference may not be used to limit movement of the piston 404 into the aperture 500.

The piston 404 can also define an opening 714 similar to opening 604 of the core 402. The opening 714 is configured to mount a bar (to be discussed below) to the piston 404. In some examples, the opening 714 is cylindrical, however, this is not meant to be limiting, and any suitable mounting structure can be provided to mount the bar to the piston 404. As with the body 102 and the core 402, the piston 404 can be composed of steel. As shown, the piston 404 can be monolithic, such as machined stock, a cast metal, a metal injection molded part, an additive manufactured part, etc. In some examples, the piston 404 can include multiple pieces assembled to create the entire piston 404.

As with the body 102 and the core 402, the piston 404 can be composed of steel. As shown, the core 402 can be monolithic, such as machined stock, cast metal, etc. In some examples, the core 402 can include multiple pieces assembled to create the entire core 402.

Figure 8:
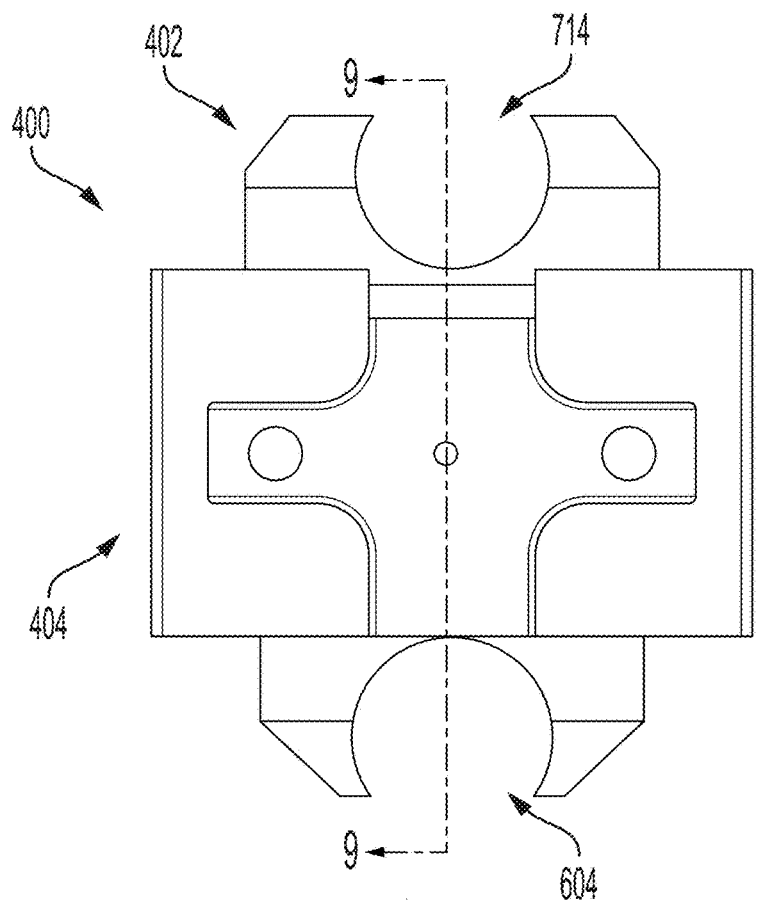
FIG. 8 is an elevation view of the core and the piston of the torque testing device of FIG. 1.

Referring to FIG. 8, a front view of selected parts of the moveable portion 400 shows the piston 404 inserted into the core 402. In some examples, the opening 604 and the opening 714 are substantially parallel to each other on opposite sides of the moveable portion 400.

Figure 9:
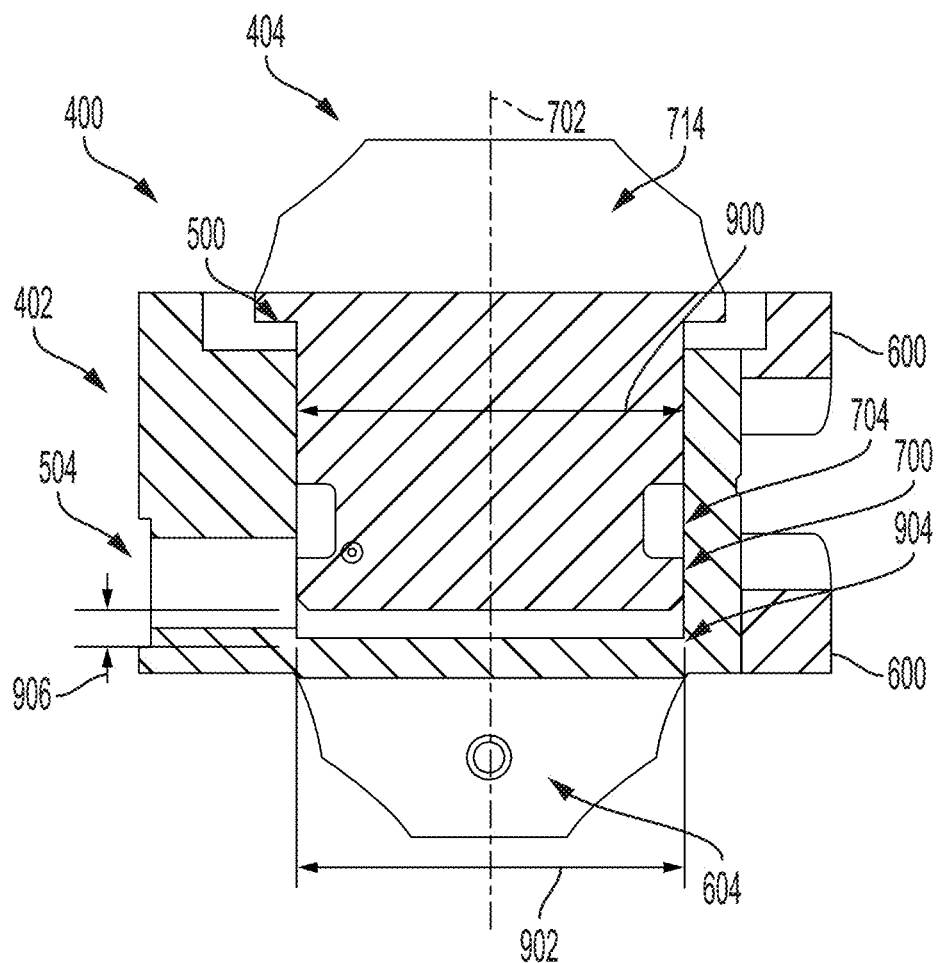
FIG. 9 is a cross-section view of the core and the piston taken along line 9-9 of FIG. 8.

Referring to FIG. 9, a cross-section view taken along line 9-9 of FIG. 8 is illustrated. As previously discussed, the proximal portion 700 of the piston 404 cooperates (e.g., is inserted into) the aperture 500. Persons having ordinary skill in the art will appreciate how to dimension and tolerance a diameter 900 of the piston 404 and a diameter 902 of the aperture 500 to help ensure reliable relative motion between the piston 404 and the diameter 902 in a direction parallel to axis 702. Axis 702 can be colinear with a central axis of the aperture 500. It is to be appreciated that proper dimensioning and tolerancing of the diameter 900 (e.g., an outside diameter of the proximal portion 700 of the piston 404) and the diameter 902 (e.g., an inside diameter of the aperture 500) can help eliminate undesired wear, galling, and misalignment of the piston 404 within the aperture 500.

In some examples, the proximal portion 700 of the piston 404 is separated from a blind end 904 of the aperture 500. As such, there is a distance 906 or a gap between the proximal portion 700 of the piston 404 and the blind end 904 of the aperture 500. The aperture 500 contains a quantity of a fluid within this gap 906 and the fluid can also form a thin film around a circumference of the piston 404, including at the proximal portion 700. In some examples, the gap 906 can measure between about $\frac{1}{32}$ inches to about $\frac{1}{4}$ inches. In a more particular example, the gap 906 can measure between about $\frac{1}{16}$ inches to about $\frac{3}{16}$ inches. In some examples, the fluid is an oil. It is to be appreciated that as the piston 404 moves into the aperture 500, the volume of space between the proximal portion 700 of the piston 404 and the blind end 904 of the aperture 500 will decrease, which causes a pressure of the fluid (e.g., the oil) to rise, given a closed system. In some examples, the fluid is considered incompressible. For the purposes of this disclosure, incompressible means that the effects of pressure on the fluid density are zero or are nearly zero so as to be negligible for calculation purposes. As such, the density and the specific volume of the fluid do not change during the flow/pressure change.

In some examples, the piston 404 is biased to move away from the core 402 by a fluid pressure within the aperture 500, such that a portion of the moveable portion 400 remains in contact with the interior wall 202. In other words, the fluid within the aperture 500 can exert hydrostatic pressure upon the piston 404 in order to maintain continuous contact between the moveable portion 400 with the interior wall 202.

The moveable portion 400 can also include a seal (not shown) between the piston 404 and the core 402, the seal inhibits flow of the fluid (e.g., oil) from the aperture 500 to a space exterior to the aperture 500. Any suitable seal structure can be used with the present disclosure, such as rod/gland seals, piston seals, bearing strips, O-rings, etc., and can be employed in conjunction with other structures such as wipers and scrapers as desired. In the shown example, the seal can be located in the seal groove 704 of the piston 404, however, the seal structure may alternatively be located in a wall of the aperture 500 or a combination of on the piston 404 and in a wall of the aperture 500.

As discussed previously, the core 402 defines a second aperture 504 that is in fluid communication with the aperture 500. A sensor 116 (shown in FIG. 1) can be attached (directly or indirectly through fittings) to the second aperture 504. For the purposes of this disclosure, the sensor 116 can include, but is not limited to, an analog gauge, an electrical sensor correlating pressure to torque, a gauge and transducer providing an output voltage to another output device, any device producing excitation creating a voltage, etc.

Returning to FIG. 1, the torque testing device 100 can include the adapter 114. The adapter 114 can be a drive socket element that cooperates with the structure 600 of the core 402 to enable the adapter 114 to impart rotational motion to the core 402. The adapter 114 can include an opening 118 configured to cooperate with a fitting on an impact wrench (not shown). In one example, the opening 118 can be a standard size to comport with standard sizes of fittings on impact wrenches such as 1-inch and ¾-inch. In some examples, the adapter may include a 1-inch size opening 118 on a first side and a ¾-inch opening 118 on a second side. It is to be understood that the impact wrench fitting can be inserted into the opening 118 and, upon operation of the impact wrench, rotational motion of the fitting of the impact wrench will urge the adapter 114 to rotate, and this rotation will urge the moveable portion 400 to rotate within the interior volume 200 of the body 102.

Figure 10:
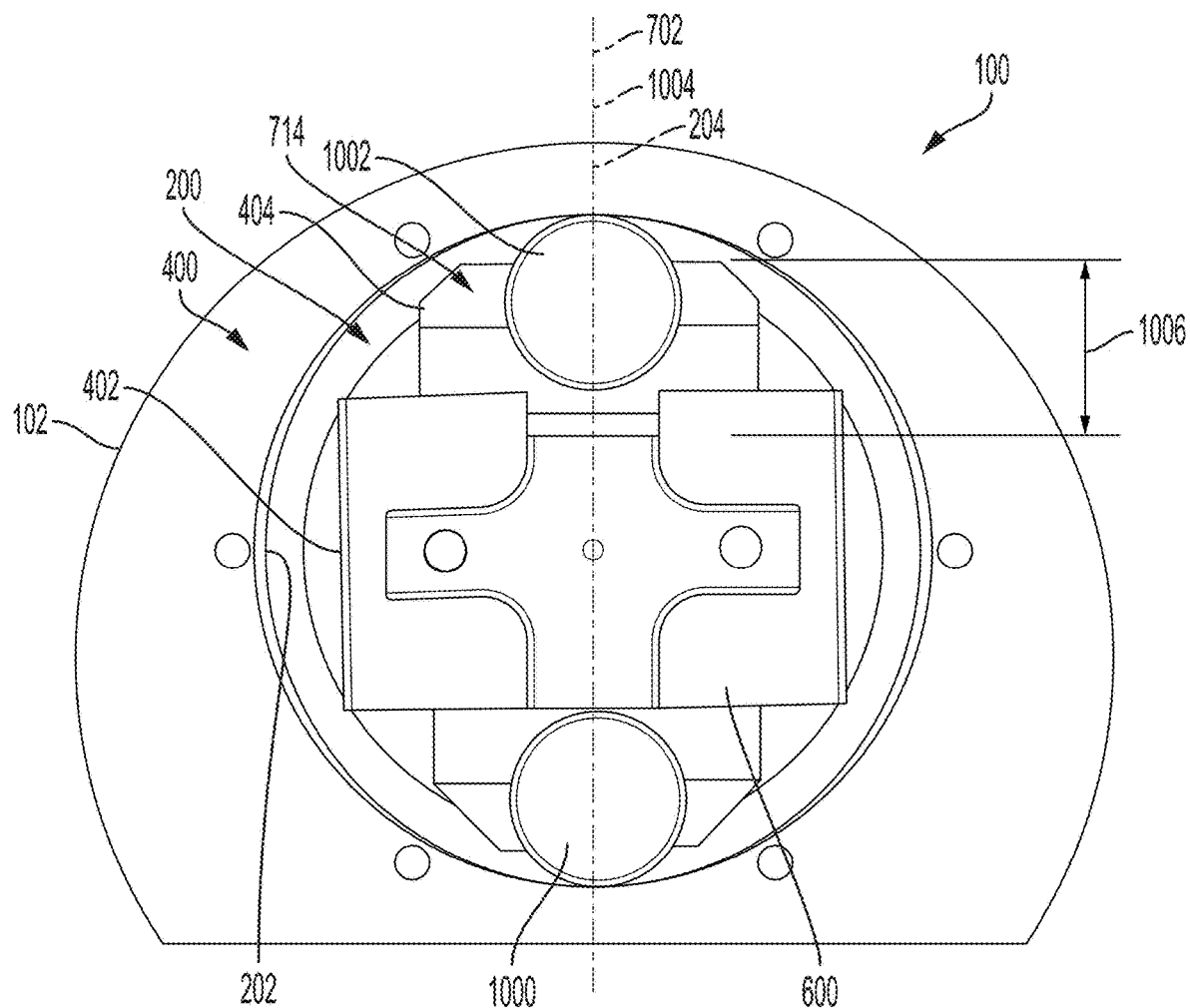
FIG. 10 is an elevation view of the torque testing device of FIG. 1 with the cover and the adapter removed showing a moveable portion in a first orientation.

Referring to FIG. 10, an elevation view of the front of the torque testing device 100 is illustrated with the cover 108, the adapter 114, and the sensor 116 removed for clarity. The moveable portion 400 is located within the interior volume 200. The torque testing device 100 can include a bar 1000 attached to the moveable portion 400. In some examples, one bar 1000 can be attached to the core 402 within the opening 604 while another bar 1002 can be attached to the piston 404 at the opening 714. In some examples, the bar 1000, 1002 has a cylindrical shape to promote line contact between the bar 1000, 1002 and the interior wall 202. Furthermore, the body 102 can include a body material (e.g., steel as previously discussed. The bar 1000, 1002 can be composed of a bar material, the bar material being softer than the body material. In some examples, the bar material can be a bronze alloy, such as 932 bronze. This difference in material hardness can help prevent galling between the bar 1000, 1002 and the interior wall 202, and help reduce undesired wear on the interior wall 202. In some examples, the bar 1000, 1002 can be a wear item that is replaced as needed, however, it is also to be noted that wear on the bars 1000, 1002 can be accounted for and minimized by the design of the presently described apparatus. For example, the piston 404 can simply travel farther away from the core 402 when material has worn away from or has been compressed into the bars 1000, 1002 or the interior wall 202.

Figure 11:
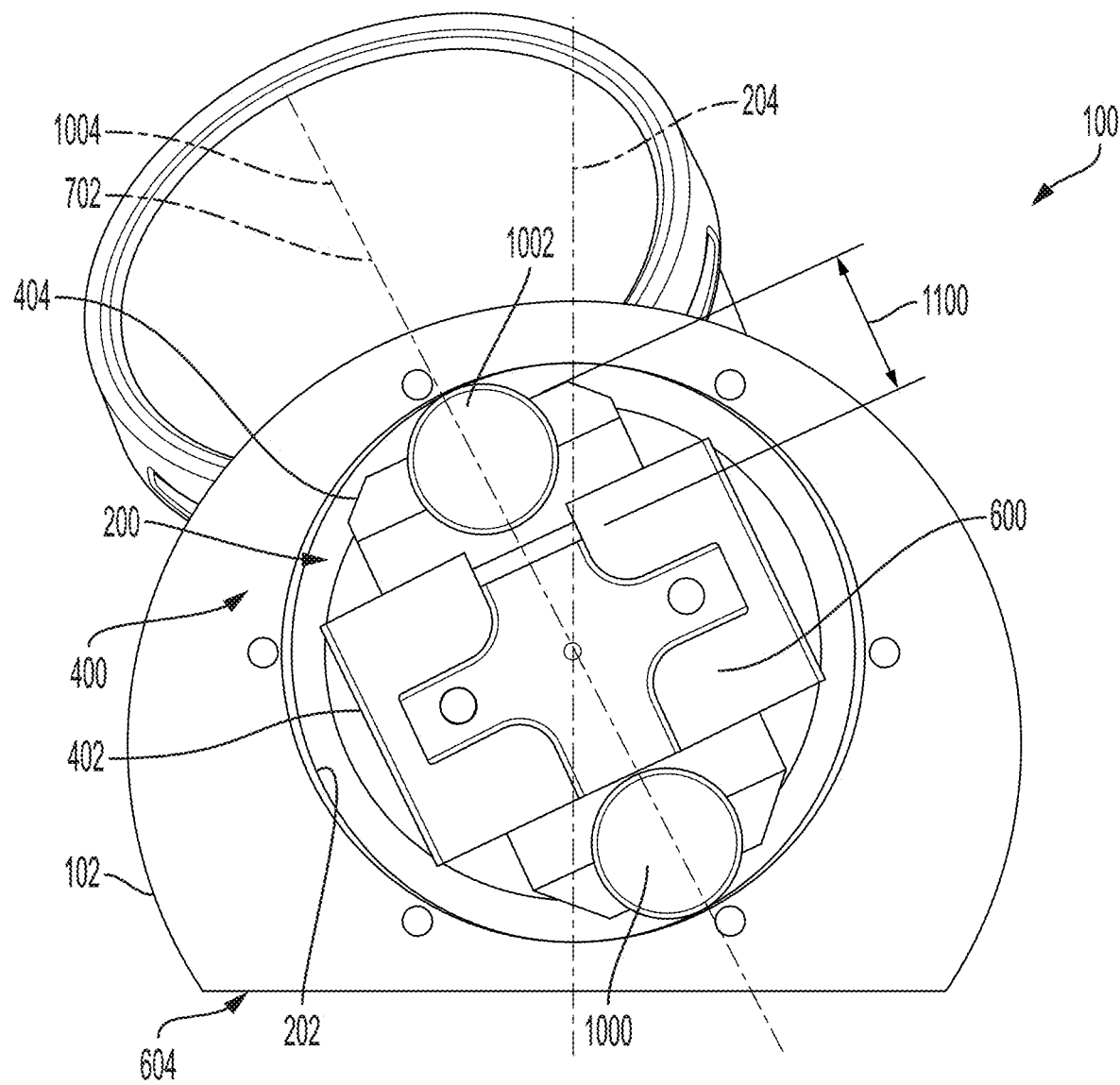
FIG. 11 is similar to FIG. 10 showing the moveable portion in a second orientation.

Referring to FIGS. 10 and 11, the torque testing device 100 is configured to determine actual torque output values for tools such as impact wrenches. It can be seen that if an operator applies an impact wrench to the adapter 114 (shown in FIG. 1) and the impact wrench is operated, the moveable portion 400 can be selectively moveable (e.g., rotated). The moveable portion 400 can be rotated from a first orientation (shown in FIG. 10) within the interior volume 200 to a second orientation (shown in FIG. 11) within the interior volume 200. In some examples, the torque testing device 100 is configured to work in both directions, clockwise and counter-clockwise. In some examples, the interior volume 200 can be filled with a lubricant such as a grease compound designed to minimize wear of the contact surfaces of the bar 1000, 1002 and the interior wall 202. This lubricant is intended to be of relatively long-term use, and not to be applied by an operator for each testing operation as in some known testing devices. It is to be understood that some wear will occur over time and testing frequency, however, the described devices and methods are designed to compensate for such wear as previously noted, thereby increasing the reliability and repeatability of test results.

Returning to FIG. 2, as previously discussed, the interior wall 202 has a non-circular cross-section. For example, the interior wall 202 can include portions of two offset circular cross-sections as shown in FIG. 2. In this example, a first dimension 224 across the interior volume 200 is a maximum distance (akin to a diameter), and as the "diameter" is measured at various locations rotationally offset from the vertical first dimension 224, the measured distance decreases, such as a second dimension 226.

Returning to FIG. 10, the moveable portion 400 contacts the interior wall 202 of the body 102. As shown, the bars 1000, 1002 contact the interior wall 202. For the purposes of detailed explanation, the moveable portion 400 can have a contact axis 1004. In some examples, the contact axis extends between the outermost points of the bar 1000 and the outermost points of the bar 1002 and beyond (e.g., the longest dimension of the moveable portion 400). The contact axis 1004 can be colinear with vertical centerline 204 (shown in FIG. 2) when the moveable portion 400 is in the first orientation as shown in FIG. 10. Additionally, the contact axis 1004 can be colinear with the first dimension 224 (shown in FIG. 2) of the interior volume 200 when the moveable portion 400 is in the first orientation. Specifically, the first orientation of the moveable portion 400 can place the moveable portion 400 in a position to coincide with the greatest distance across the interior volume 200 (e.g., the first dimension 224).

Referring to FIG. 11, the contact axis 1004 can be colinear with the second dimension 226 (shown in FIG. 2) of the interior volume 200 when the moveable portion 400 is in the second orientation. As described previously, the second dimension 226 is less than the first dimension 224. It is to be understood that as the moveable portion 400 rotates from a first orientation (e.g., the vertical position shown in FIG. 10), the decreasing measurement of the dimension across the interior volume 200 will create a force urging the piston 404 into the core 402. As such, when the moveable portion 400 is in the first orientation (FIG. 10), the piston 404 is located at a first distance 1006 from the core 402. The first distance 1006 is shown measured from a top surface of the piston 404 to a surface of the core 402 surrounding the aperture 500, however, any reference distance or dimension can be used.

Furthermore, when the moveable portion 400 is in a second orientation (e.g., the rotated position shown in FIG. 11), the piston 404 is located at a second distance 1100 from the core 402, and the second distance 1100 is less than the first distance 1006. In other words, rotation of the moveable portion 400 from the first orientation to the second orientation urges the piston 404 into the core 402. the reduced length between the second dimension 226 and the first dimension 224 creates a force on the piston 404 through a cam action and the force urges the piston 404 into the aperture 500 defined by the core 402. As noted previously, as the piston 404 moves into the aperture 500, the volume of space between the proximal portion 700 of the piston 404 and the blind end 904 of the aperture 500 will decrease, which causes a pressure of the fluid (e.g., the oil) to rise, to create increased fluid pressure in the aperture 500.

This increased pressure of the fluid within the aperture 500 will act upon the proximal portion 700 of the piston 404, among other things to resist the force urging the piston 404 into the aperture 500. As the moveable portion 400 rotates to ever smaller dimensions within the interior volume, the fluid pressure within the aperture 500 continues to increase until the fluid pressure can resist the force urging the piston 404 into the aperture 500. At this pressure balance/orientation, the impact wrench will cease rotating the moveable portion 400. As such, an operator uses the torque testing device 100 by operating the torque tool to move the moveable portion 400 to generate a fluid pressure between the piston 404 and the core 402 until the fluid pressure between the piston 404 and the core 402 is great enough to resist further movement of the moveable portion 400.

It can be seen that as one bar 1000 is able to move relative to a center of the core 402 and the other bar 1002 is fixed relative to the center of the core 402, the moveable portion 400 does not necessarily rotate about the fixed central axis 106 of the torque testing device 100. Rather, an axis of rotation of the moveable portion 400 may vary in location during operation of the torque testing device 100.

It is to be appreciated that the moveable portion 400 is described as having a first orientation and a second orientation, however, as the moveable portion 400 is selectively moved (e.g., rotated within the interior volume 200), the moveable portion 400 moves along a continuum of orientations or positions. As such, the moveable portion 400 can have an infinite number of orientations or positions within the interior volume, and the first orientation and second orientation are designations utilized to describe the operation of the torque testing device as it moves along the continuum of orientations.

As shown in FIG. 9, the second aperture 504 is in fluid communication with the aperture 500. The sensor 116 can be attached to the core 402 at the second aperture 504 either directly or through a number of fittings, as desired. As the fluid pressure increases within the aperture 500, the gauge will be subject to that fluid pressure change. In some examples, the gauge face can include a needle and a dial that display (e.g., indicate) the fluid pressure (e.g., in pounds per square inch). In other examples, the gauge face can include a display calibrated to display a torque (e.g., ft-lbs) readout. In yet further examples, the gauge face can include a combination of fluid pressure and torque markings.

In some examples, each torque testing device 100 can be calibrated as it is produced and tested to help ensure the accuracy of the torque value shown on the gauge as it is related to the pressure developed in the aperture 500. Statistical analysis can narrow the margin of error, and each gauge face can be individually produced for a unique torque testing device 100 based upon the statistical analysis of test results for the particular torque testing device 100. In some examples, the sensor 116 can hold its maximum value for a predetermined time to enable the operator to read the torque value from the sensor 116.

It is to be understood that the sensor 116 is but one way to communicate the maximum torque developed by an impact wrench as measured by the torque testing device 100. In other examples, sensors within the torque testing device 100 can transmit the information to a data collection device, a torque display on a workbench, a personal electronic device, etc.

In some examples, the described torque testing device 100 experiences increased fluid pressure by dynamically operating a torque tool (e.g., an impact wrench) causing a gauge attached to the torque testing device to display a torque value. The distinction of dynamically operating the tool can arise from the fact that the presently described torque testing device 100 and associated methods do not work against a dead stop or torsion of a static beam which can be described as static applications of torque measurement. Instead, the presently described torque testing device 100 and associated methods enable the torque tool to develop momentum and be tested in a way that is much closer to real world torque tool action.

Figure 12:
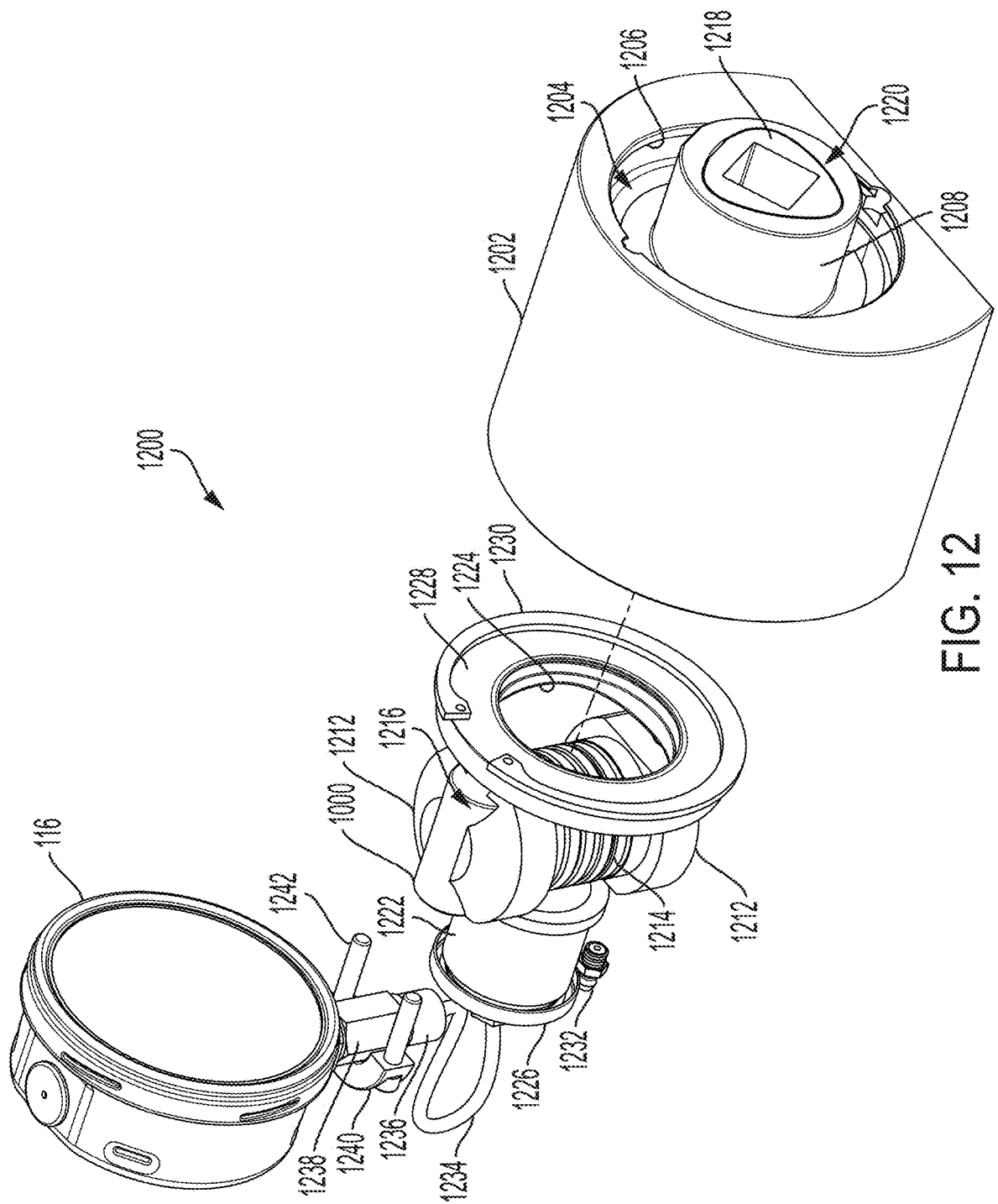
FIG. 12 an exploded view of another embodiment of a torque testing device is illustrated.

Referring to FIG. 12, an exploded view of another embodiment of a torque testing device 1200 is illustrated. The following paragraphs describe embodiments of the torque testing device 1200 including a plurality of pistons rather than a single piston as previously described. In the interest of brevity, many of the parts enumerated with FIG. 12 will not be discussed in great detail, as they are similar to those in the previous embodiments or are readily understood by a person having ordinary skill in the art.

A body 1202 can be similar to, or identical to the body 102 previously discussed. Of course, various mounting holes, grooves, exterior shape, etc. may differ from the body 102 of the previous embodiments, however, the interior volume 1204 and the non-circular cross-section of the interior wall 1206 can be similar or identical to the body 102 and function in the same ways.

The torque testing device 1200 also includes a core 1208 that will be described in greater detail below. The core 1208 defines an aperture 1210 (shown in FIG. 10) that is a through aperture, or through-hole configured to accommodate two pistons 1212 rather than one piston cooperating with a blind hole as with other embodiments. In some examples, each piston 1212 can include a piston ring or U-cup or O-ring 1214 or other similar structure such as seals, wipers, etc. as previously described. Each piston 1212 can define an opening 1216 configured to mount the bar 1000 to the piston 1212. In this embodiment, a bar 1000 is mounted to each piston 1212 rather than the previously described embodiments having one bar 1000 mounted to the core 402 and one bar 1002 mounted to the piston 404. The bars 1000 interact with the interior wall 202, 1206 as with the previously described embodiments.

The torque testing device 1200 further includes an adapter 1218 configured to cooperate with the core 1208. In some examples, at least a portion of the adapter 1218 fits within an aperture 1220 defined by the core. In the shown example of FIG. 12, the adapter 1218 can include an exterior cross-section of a triangle having circular radius sides and rounded corners, similar to a Reuleaux triangle. This shape and corresponding aperture shape are merely examples and are not meant to be limiting. The adapter 1218 can include a square aperture to cooperate with a torque tool (not shown) as previously described.

In some examples, a sleeve bearing 1222 is included to help maintain alignment of the core 1208 and other components on the central axis 106. In some examples, the sleeve bearing 1222 cooperates with both the core 1208 and the body 1202, promoting smooth rotation of the core 1208. Additionally, some examples of the torque testing device 1200 can include a number of components to promote positive location of the core and seal some internal components such as the aperture 1210 from exterior spaces. For example, the assembly of the torque testing device 1200 can include a wave disc spring 1224, a spring-loaded seal 1226, and a shaft seal 1228. A retaining ring 1230 can be included to secure many of the previously described components within the interior volume 1204 of the body 1202.

In some examples, a grease fitting 1232 is provided to enable an operator to place grease within the interior volume 1204. As noted previously, the grease is intended to be used for a number of cycles of operation of the torque testing device, and is not intended to be lubrication that is applied to many testing devices prior to each operation of the testing device. The grease fitting 1232 cooperates with an aperture (not shown) in the body 1202 such that the grease fitting 1232 is in fluid communication with the interior volume 1204.

As also noted previously, a sensor 116 (e.g., a gauge) can be provided and can be in fluid communication with the aperture 1210 of the core 1208 to register, record, display, transmit, etc. a pressure reading or an associated torque value achieved by the torque tool in a torque tool test. Various other components can be used with the sensor 116, such as a hydraulic hose 1234, any number of hydraulic fittings 1236, a sensor adapter 1238, a shaft collar 1240, and associated threaded fasteners 1242 to maintain the location of the gauge, etc. Any suitable arrangement of the hydraulic and sensor devices is satisfactory and is understood by a person having skill in the art. In some examples, certain components and features such as the interior volume 1204, the core 1208, etc. can be symmetrical or centered about the central axis 106.

Figure 13:
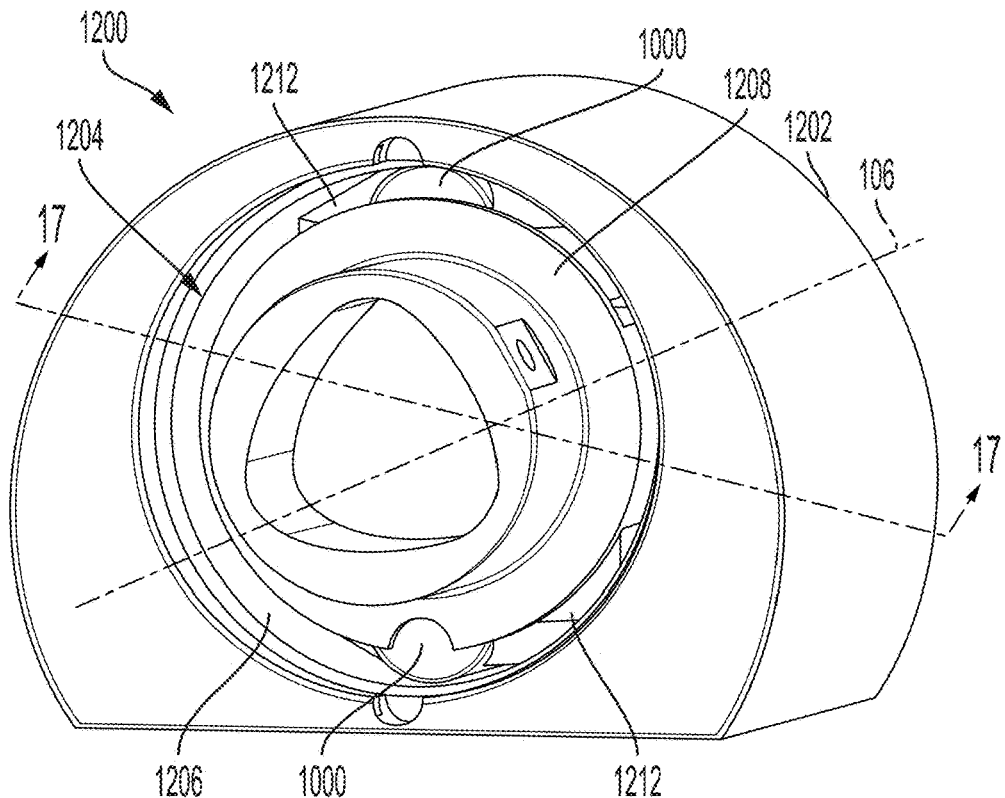
FIG. 13 is a perspective view of the torque testing device of FIG. 12.

Referring to FIG. 13, a perspective view of an example torque testing device 1200 according to some embodiments is illustrated. The shaft seal 1228 and the retaining ring 1230 are removed for clarity, and the bars 1000 are visibly in contact with the interior wall 1206 of the body 1202. The core 1208, the pistons, 1212, and the bars 1000 are shown in a first orientation, corresponding to bars 1000 contacting the interior wall 1206 at the greatest distance across the interior volume 1204. This first orientation corresponds to the torque testing device 1200 alignment prior to testing a torque tool.

Figure 14:
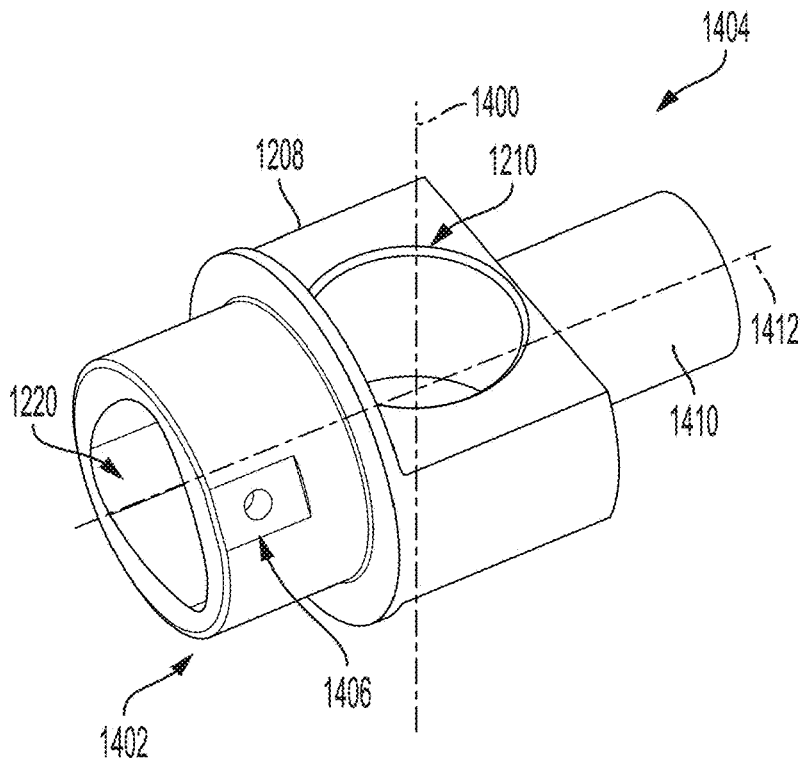
FIG. 14 is a perspective view of an example core of the torque testing device of FIG. 12.

Referring to FIG. 14, a perspective view of an example core 1208 is illustrated. As mentioned previously, the core 1208 defines the aperture 1210 that cooperates with a plurality of pistons 1212 (shown in FIG. 16). The aperture 1210 can be a through-hole having a centerline represented by line 1400. In some examples, one piston 1212 is inserted at each opening of the aperture 1210 and act opposite to one another. For example, as the core 1208 rotates to the second orientation having a shorter distance across the interior volume 1204 than the first orientation, the pistons 1212 are moved toward the interior of the aperture 1210 (e.g., toward each other) and thereby increase a fluid pressure within the aperture 1210.

The core 1208 can extend from a proximal end 1402 to a distal end 1404. The proximal end 1402 can include the aforementioned aperture 1220 configured to contain at least a portion of the adapter 1218 (shown in FIG. 12). The proximal end 1402 can also define a set screw aperture 1406 to secure the adapter 1218 in a fixed location. The distal end 1404 can include a cylindrical section 1410 centered about a core centerline 1412 which can be parallel or colinear with central axis 106. The cylindrical section 1410 can cooperate with the sleeve bearing 1222 (shown in FIG. 12) in some examples.

While not shown, the present disclosure contemplates embodiments including a plurality of pistons 1212 cooperating with the core 1208, such as three pistons or four pistons, etc. However, these further arrangements would necessitate different apertures 1210 and a differing profile of the interior wall 1206 to ensure that each piston 1212 would be rotating toward positions having a lesser dimension across the interior volume 1204 when moving from the first orientation to the second orientation.

Figure 15:
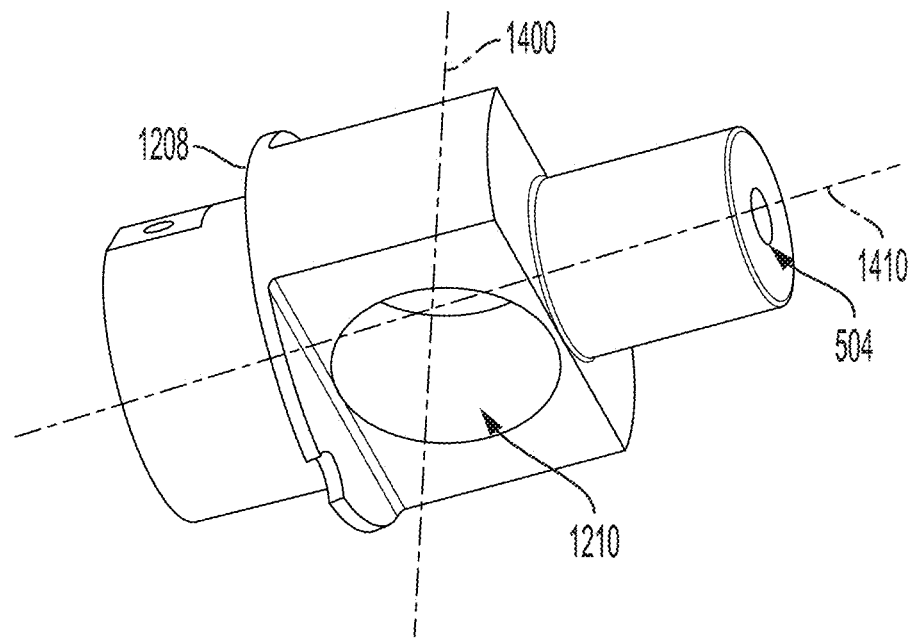
FIG. 15 is similar to FIG. 14.

Referring to FIG. 15, a second perspective view of an example core 1208 is illustrated. The core 1208 can define a second aperture 504 that is in fluid communication with the aperture 1210, enabling the aperture 1210 to be in fluid communication with the sensor 116, such that a gauge can sense a pressure within the aperture 1210.

Figure 16:
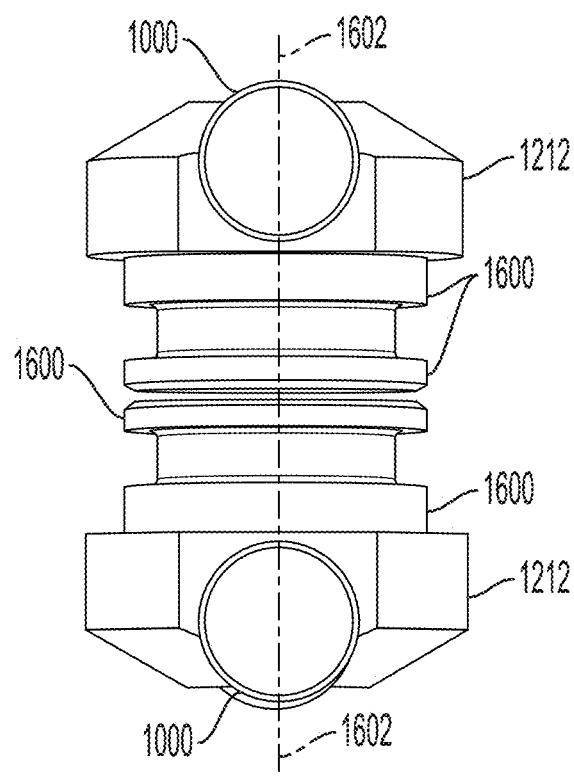
FIG. 16 is an elevation view of two pistons and bars that cooperate with the core.

Referring to FIG. 16, an elevation view of two pistons 1212 and bars 1000 that cooperate with the core 1208. The pistons 1212 can have a circular cross-section, particularly at locations 1600. As previously described, the aperture 1210 of the core 1208 is defined by a circular cross-section such that the pistons 1212 and the aperture 1210 of the core 1208 cooperate to enable at least a portion of the pistons 1212 to move into and out of the aperture 1210. The pistons can have centerlines 1602. In some examples, the centerlines 1602 of the pistons 1212 are colinear. In some examples, these centerlines 1602 can be colinear with the centerline 1400 of the aperture 1210.

Figure 17:
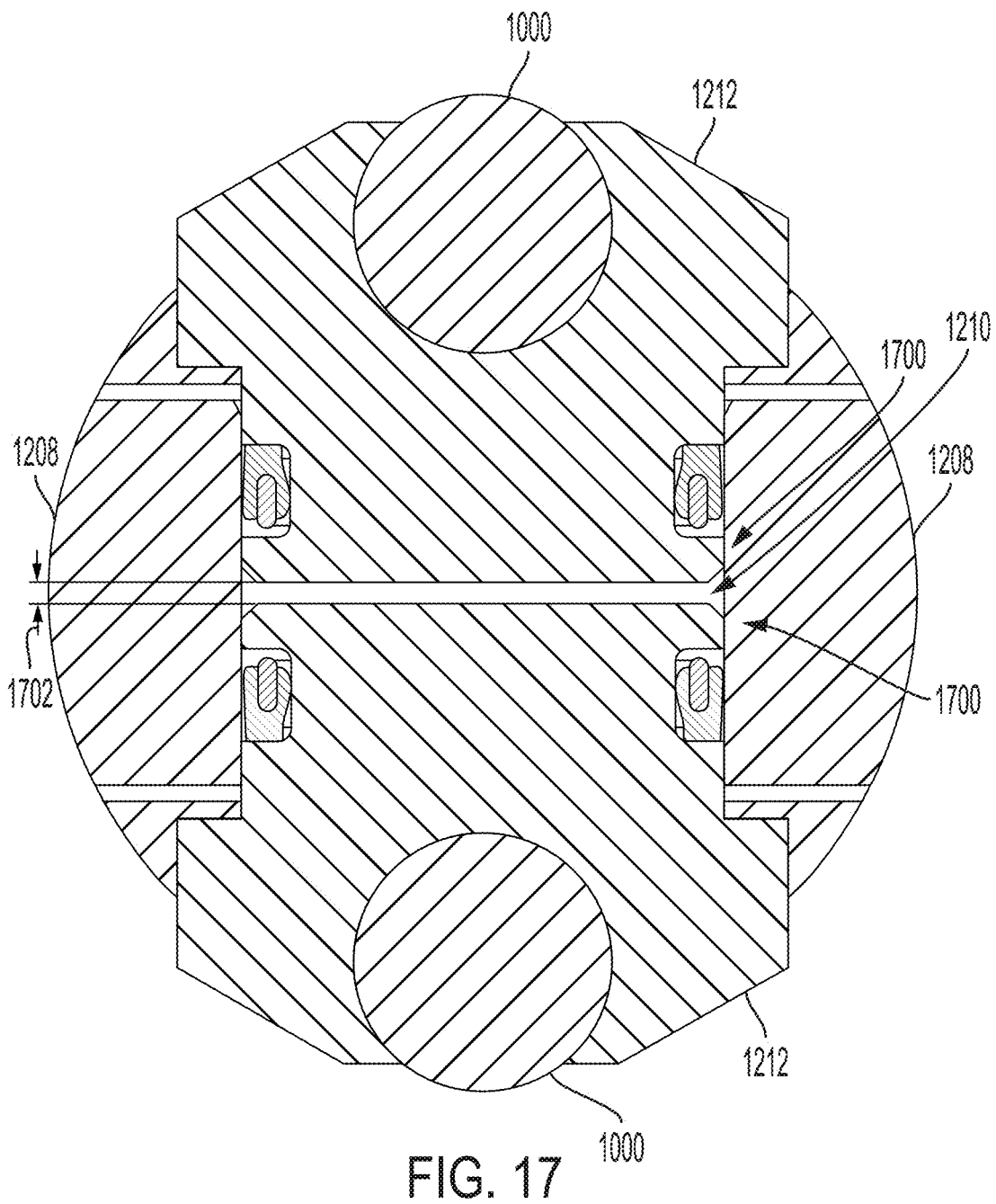
FIG. 17 is a cross-sectional view of the core and the pistons taken along line 17-17 of FIG. 13.

Referring to FIG. 17, a cross-sectional view of the core 1208 and the pistons 1212 taken along line 17-17 of FIG. 13 is illustrated. As previously discussed, a distal end 1700 of the piston 1212 cooperates (e.g., is inserted into) the aperture 1210. Persons having ordinary skill in the art will appreciate how to dimension and tolerance a diameter of the piston 1212 and a diameter of the aperture 1210 to help ensure reliable relative motion between the pistons 1212 and the aperture 1210 in a direction parallel to axis 1400 (shown in FIG. 14).

In some examples, a distal end 1700 of one piston 1212 is separated from a distal end 1700 of the other piston 1212. As such, there is a distance 1702 or a gap between the respective distal ends 1700 of the pistons 1212. The aperture 1210 contains a quantity of a fluid within this gap 1702 and the fluid can also form a thin film around a circumference of the piston 1212. In some examples, the gap 1702 can measure between about ⅟32 inches to about ¼ inches. In a more particular example, the gap 1702 can measure between about ⅟16 inches to about ³⁄16 inches. In some examples, the fluid is an oil. It is to be appreciated that as the pistons 1212 move into the aperture 1210 (and toward each other), the volume of space between the distal end 1700 of one of the pistons 1212 and the distal end 1700 of the other of the pistons 1212 will decrease, which causes a pressure of the fluid (e.g., the oil) to rise, given a closed system. In some examples, the fluid is considered incompressible. For the purposes of this disclosure, incompressible means that the effects of pressure on the fluid density are zero or are nearly zero so as to be negligible for calculation purposes. As such, the density and the specific volume of the fluid do not change during the flow/pressure change.

Figure 18:
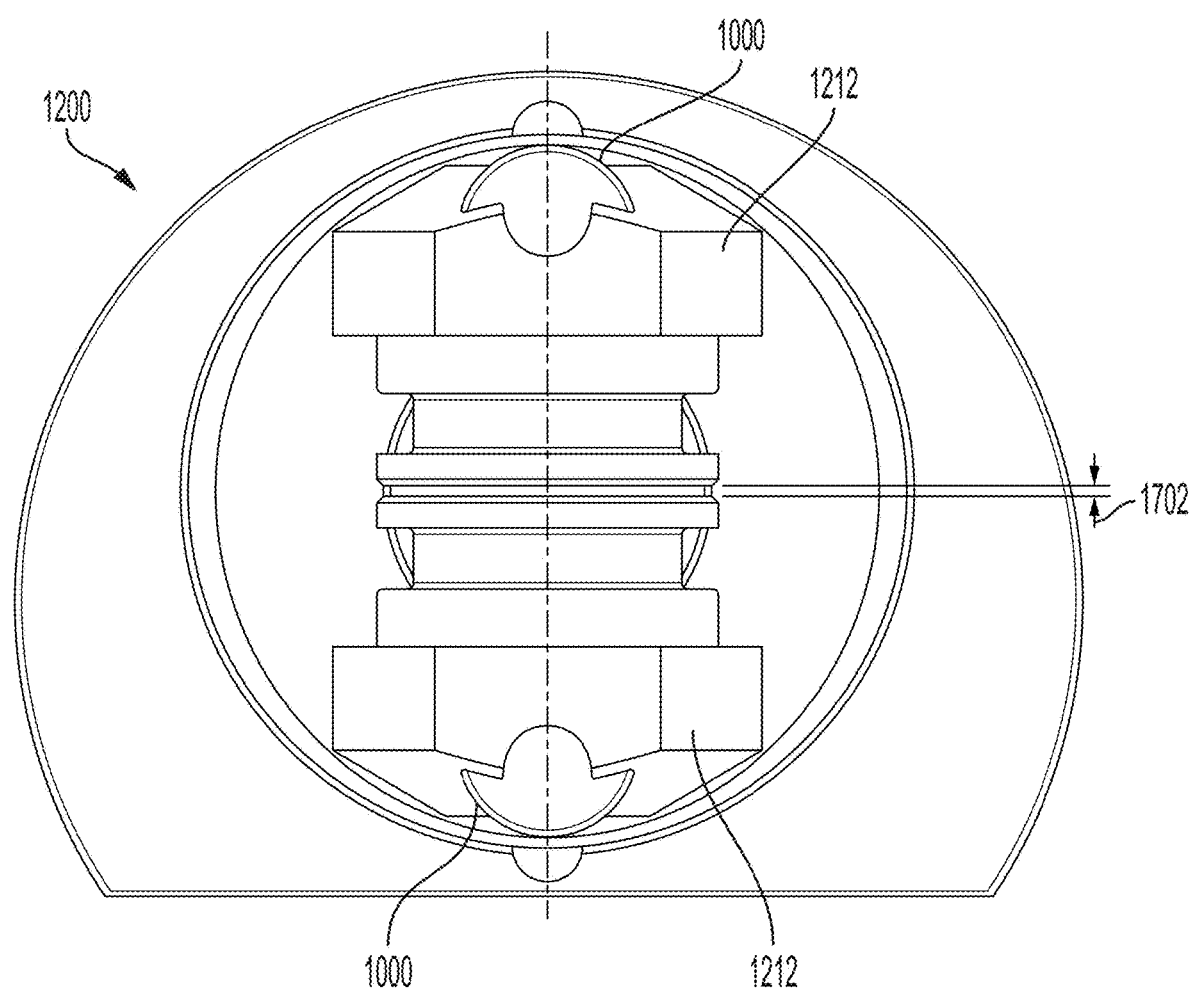
FIG. 18 is an elevation view of selected parts of an example torque testing device in a first orientation.

Referring to FIG. 18, an elevation view of selected parts of an example torque testing device 1200 is illustrated, showing the pistons 1212 and bars 1000 being in a first orientation. Some elements (e.g., the core 1208) are removed for clarity and ease of explanation. As noted previously, when in the first orientation, the gap 1702 has a first length. Again, this first orientation represents the torque testing device 1200 prior to testing the torque tool.

Figure 19:
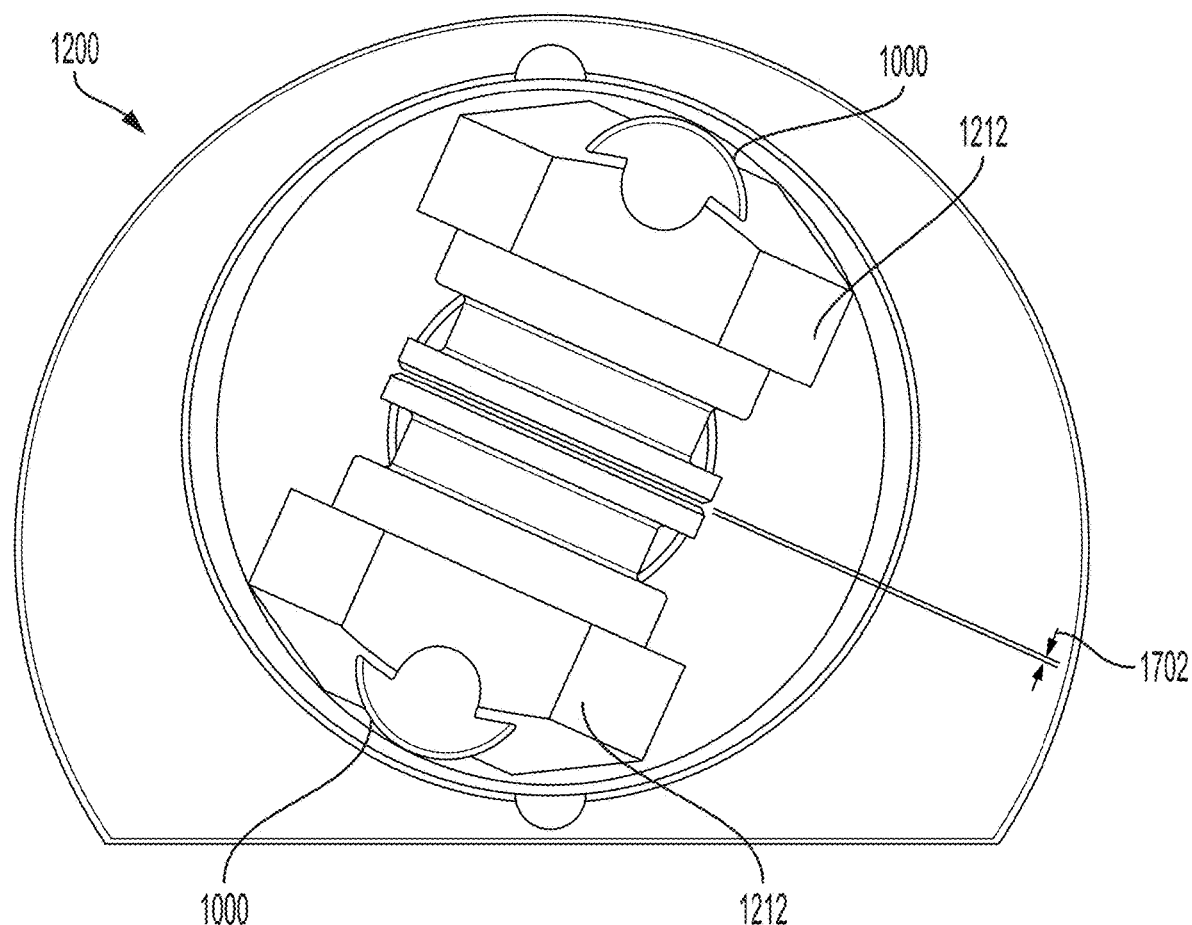
FIG. 19 is similar to FIG. 18 showing selected parts in a second orientation.

Referring to FIG. 19, an elevation view of selected parts of an example torque testing device 1200 is illustrated, showing the pistons 1212 and bars 1000 being in a second orientation. As the torque tool is tested, the torque tool applies a rotational force to the core 1208 urging the contact points of the bars 1000 from the widest portion of the interior volume 1204 to increasingly shorter distances between sides (interior wall 1206) of the interior volume 1204. The shorter distances force the pistons 1212 farther into the aperture 1210 (not shown in FIG. 19) to reduce the distance of the gap 1702, thereby increasing the pressure of the fluid (e.g., oil) within the aperture 1210. The torque tool continues to rotate the core 1208 and the bars 1000 until the rotational force of the torque tool can no longer overcome the pressure generated within the aperture 1210. At this point, the torque tool stalls and the pressure or corresponding torque value can be read from the sensor 116 (e.g., the gauge.

It is worthy of note that in many examples of a torque testing operation, the pistons 1212 will not come into contact with one another within the aperture 1210. The body 1202, the interior wall 1206, and the length of the pistons 1212 can be designed and manufactured such that the pistons 1212 do not contact one another during testing cycles. In other words, the gap 1702 will have a non-zero, positive dimension associated with it.

A number of benefits can be realized using the apparatus and methods described in the present disclosure. The presently described device can be more economical to construct and operate while being of relatively simple operation, enabling a greater number of operators to verify torque output of various torque tools. Additionally, the torque testing device can provide greater repeatability for torque testing devices with more accurate results. Another benefit can be the dynamic testing operation which more accurately represents the real-world behavior and action of the torque tools and fasteners. This benefit can also increase the accuracy of the maximum torque output values.

Other benefits can include the torque testing tool enabling the testing of various size devices. Some known bolt tensioning test devices and torque testing devices are suitable for a smaller range of fastener sizes or tension values without additional accessories. Instead, the described device and methods can be suitable for a relatively wide range of torque tools, fastener sizes, etc. enabling operators to purchase fewer testing devices. Also, the torque testing tool can produce accurate torque measurements in both clockwise and counterclockwise operation directions. Furthermore, some known testing devices require particular lubrications to be applied to test bolts, test nuts, and test washers and device of the present disclosure can reduce or eliminate the need for these lubrications to be applied to individual threaded components for each individual torque test.

Another significant benefit can be the direct torque measurement display. Some known methods correlate a tension developed in a test bolt to a torque value by utilizing a "torque factor," but there appears to be no data that verifies the repeatability of the torque factor.

Other benefits of the described devices and methods can include elimination of threaded members to conduct the torque test. Threaded members can present many variables to accurate torque measurement due to the various contact surfaces that may exhibit wear that can affect the torque measurement. Additionally, the presently described devices and methods can eliminate variability in torque measurement due to the relationship of the mass and stiffness variables of traditional inertial mass systems used in known torque testing devices.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component generally correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A torque testing device comprising:
   a body defining an interior volume, wherein the interior volume is defined by an interior wall;
   a movable portion within the interior volume, the movable portion being selectively movable from a first orientation within the interior volume rotatable about a central axis to a second orientation within the interior volume, the movable portion comprising:
      a core, the core defining an aperture having an axis; and
      a piston, a portion of the piston cooperating with the aperture of the core, wherein:
         when the movable portion is in the first orientation, the piston is located at a first distance from the core, the first distance measured perpendicular to the central axis and along the axis of the aperture, and
         when the movable portion is in the second orientation, the piston is located at a second distance from the core, the second distance measured perpendicular to the central axis, and the second distance being less than the first distance, wherein:
      the interior wall has a non-circular cross-section taken along the axis of the aperture and perpendicular to the central axis.

2. The torque testing device of claim 1, wherein the aperture contains a quantity of a fluid.

3. The torque testing device of claim 1, further comprising a seal between the piston and the core, the seal inhibits flow of a fluid from the aperture of the core to a space exterior to the aperture, the seal enabling an increase in a pressure in the aperture.

4. The torque testing device of claim 1, wherein:
   the movable portion contacts the interior wall of the body, the movable portion has a contact axis, and
   the contact axis is colinear with a first dimension of the interior volume when the movable portion is in the first orientation and the contact axis is colinear with a second dimension of the interior volume when the movable portion is in the second orientation, the second dimension being less than the first dimension.

5. The torque testing device of claim 4, wherein the reduced length between the second dimension and the first dimension imparts a force on the piston, the force urges the piston into the aperture to increase a fluid pressure in the aperture.

6. The torque testing device of claim 1, wherein the non-circular cross-section is defined by portions of two offset circular cross-sections.

7. The torque testing device of claim 6, wherein the two offset circular cross-sections are offset by a distance of about 0.2 inches to about 0.05 inches.

8. The torque testing device of claim 7, wherein the two offset circular cross-sections are offset by a distance of about 0.1 inches to about 0.05 inches.

9. The torque testing device of claim 1, further comprising a bar attached to the movable portion.

10. The torque testing device of claim 9, wherein the body comprises a body material and the bar comprises a bar material, the bar material being softer than the body material.

11. The torque testing device of claim 9, wherein the bar has a cylindrical shape.

12. The torque testing device of claim 9, wherein a portion of the movable portion defines a cylindrical bore configured to attach the bar to the movable portion.

13. The torque testing device of claim 1, further comprising a gauge attached to the aperture and in fluid communication with the aperture, the gauge configured to indicate a torque value.

14. The torque testing device of claim 1, wherein the piston is biased to move away from the core by a fluid pressure within the aperture, such that a portion of the movable portion is in contact with the interior wall.

15. A method of operating a torque testing device comprising:
   providing a torque testing device comprising:
      a body defining an interior volume, wherein the interior volume is defined by an interior wall, the interior wall having a non-circular cross-section taken perpendicular to a central axis, and
      a movable portion having a contact axis, the movable portion located within the interior volume, wherein the movable portion includes a first component configured to move relative to a second component in a direction along the contact axis and perpendicular to the central axis to create a fluid pressure between the first component and the second component,
      the contact axis is colinear with a first dimension of the interior volume when the movable portion is in a first orientation and the contact axis is colinear with a second dimension of the interior volume when the movable portion is in a second orientation, the second dimension being less than the first dimension; and
   moving the movable portion from the first orientation to the second orientation such that the first component moves into an aperture defined by the second component to increase the fluid pressure in the aperture.

16. The method of claim 15, further comprising increasing the fluid pressure between the first component and the second component by dynamically testing a torque tool attached to the movable portion.

17. A method of operating a torque testing device comprising:
   providing a torque testing device comprising:
      a body defining an interior volume centered about a central axis, wherein the interior volume is defined by an interior wall, the interior wall having a non-circular cross-section taken perpendicular to the central axis;
      a movable portion within the interior volume, the movable portion comprising:
         a core, the core being selectively movable from a first orientation within the interior volume to a second orientation within the interior volume, the core defining an aperture having an axis perpendicular to the central axis; and
         a piston, a portion of the piston cooperating with the aperture of the core, wherein
         when the core is in the first orientation, the piston is located at a first distance from the core, the first distance measured along the axis of the aperture and perpendicular to the central axis, and
         when the core in the second orientation, the piston is located at a second distance from the core, the second distance measured along the axis of the aperture and perpendicular to the central axis, the second distance being less than the first distance;
      attaching a torque tool to the core; and
      operating the torque tool to rotate the movable portion about the central axis to generate a fluid pressure between the piston and the core until the fluid pressure between the piston and the core is great enough to resist further rotation of the movable portion.

18. The method of claim 17, further comprising reading a gauge calibrated to display a torque value, the gauge attached to the aperture and in fluid communication with the aperture.

19. A torque testing device comprising:
   a body defining an interior volume; and
   a selectably rotatable load cell located in the interior volume of the body, the rotatable load cell having a first position and a second position, the rotatable load cell comprising:
      a movable portion within the interior volume, the movable portion being selectively movable from the first position within the interior volume rotatable about a central axis to the second position within the interior volume, the moveable portion comprising:
         a core, defining an aperture;
         a piston, a portion of the piston cooperating with the aperture of the core; and
         a gauge attached to the aperture and in fluid communication with the aperture, the gauge configured to measure pressure within the aperture,
   wherein:
      rotation of the rotatable load cell from the first position to the second position increases a fluid pressure within the aperture, and
      the rotatable load cell comprising a closed hydraulic system such that the aperture is sealed to prevent fluid communication with an exterior volume relative to the rotatable load cell.

* * * * *